(12) United States Patent
Svoboda

(10) Patent No.: US 8,188,014 B2
(45) Date of Patent: May 29, 2012

(54) IN-SITU SOLIDIFICATION OF INVERT EMULSION FLUIDS TO FORM GAS TIGHT ANNULAR BARRIER

(75) Inventor: Charles Svoboda, Katy, TX (US)

(73) Assignee: M-I L.L.C., Houston, TX (US)

( * ) Notice: Subject to any disclaimer, the term of this patent is extended or adjusted under 35 U.S.C. 154(b) by 535 days.

(21) Appl. No.: 11/962,495

(22) Filed: Dec. 21, 2007

(65) Prior Publication Data

US 2008/0096773 A1   Apr. 24, 2008

Related U.S. Application Data

(62) Division of application No. 11/537,027, filed on Sep. 29, 2006, now Pat. No. 7,334,639.

(60) Provisional application No. 60/722,342, filed on Sep. 30, 2005.

(51) Int. Cl.
*C09K 8/36* (2006.01)

(52) U.S. Cl. ........ 507/241; 507/244; 507/260; 507/263; 507/265; 507/267; 166/305.1

(58) Field of Classification Search .......... None
See application file for complete search history.

(56) References Cited

U.S. PATENT DOCUMENTS

| | | | |
|---|---|---|---|
| 4,034,811 A | 7/1977 | Sparlin et al. | |
| 4,671,357 A | 6/1987 | Binder, Jr. | |
| 5,309,995 A | 5/1994 | Gonzalez et al. | |
| 5,330,005 A * | 7/1994 | Card et al. | 166/280.2 |
| 5,354,456 A * | 10/1994 | Montgomery et al. | 507/216 |
| 6,283,213 B1 | 9/2001 | Chan | |
| 6,439,309 B1 * | 8/2002 | Matherly et al. | 166/276 |
| 6,739,414 B2 | 5/2004 | Brookey et al. | |
| 6,815,399 B1 | 11/2004 | Johnson et al. | |
| 6,989,354 B2 * | 1/2006 | Thaemlitz et al. | 507/131 |
| 2004/0147404 A1 | 7/2004 | Thaemlitz et al. | |
| 2004/0171497 A1 * | 9/2004 | Growcock et al. | 507/100 |

FOREIGN PATENT DOCUMENTS

WO   03/042489 A2   5/2003

OTHER PUBLICATIONS

Extended European Search Report for European Application No. 06815937-5-1218, mailed on Nov. 4, 2009 (10 pages).

(Continued)

*Primary Examiner* — John J Figueroa
(74) *Attorney, Agent, or Firm* — Osha • Liang LLP

(57) ABSTRACT

A method for sealing a subterranean zone is disclosed. The method includes the steps of preparing a wellbore fluid, placing the wellbore fluid into at least a portion of an annular space between the sidewalls of a wellbore and the exterior of a casing string disposed in the wellbore, and allowing the wellbore fluid to solidify therein, wherein the wellbore fluid includes an oleaginous fluid as the continuous phase of the wellbore fluid, a non-oleaginous fluid as the discontinuous phase of the wellbore fluid, and about 5 to about 50 pounds per barrel of a thermally activated hydrocarbon gellant.

5 Claims, 2 Drawing Sheets

OTHER PUBLICATIONS

Anonymous: "VERSAPAC" Internet Article (Product Bulletin), [Online] May 25, 1999, XP002550117; Retrieved from the Internet: URL:http://www.miswaco.com/Products_and_Services/Wellbore_Productivity/Reservoir_Drill-IN_Fluid_Products/Reservoir_Drill_In_ProductsDocuments/VERSAPAC.pdf> Retrieved Oct. 13, 2009 (2 pages).

Anonymous: "VERSA-PAC Instant Cold Pack" Material Safety Data Sheet, [Online] Mar. 15, 2004, pp. 1-4, XP002550189; Retrieved from the Internet: URL:http://www.uni-patch.com/PDF/MSDS_InstantColdPack.pdf> Retrieved on Oct. 13, 2009 (4 pages).

Anonymous: "VERSA-PAC Reusable Heavy Duty 1-21 Cold Pack" Material Safety Data Sheet, [Online] Mar. 15, 2004, pp. 1-4, XP002550190; Retrieved from the Internet: URL:http://www.uni-patch.com/PDF/MSDS_ReusableHeavyDuty2.pdf> Retrieved on Oct. 13, 2009 (4 pages).

PCT International Search Report issued in International Application No. PCT/US2006/038295 dated Mar. 13, 2007 (3 pages).

PCT Written Opinion issued in International Application No. PCT/US2006/038295 dated Mar. 13, 2007 (3 pages).

Examination Report issued in Canadian Application No. 2,623,057 dated Jun. 11, 2010 (1 page).

Communication Pursuant to Article 94(3) EPC issued Jul. 6, 2011 in corresponding European application No. 06 815 937.5 (12 pages).

* cited by examiner

IN-SITU SOLIDIFICATION OF INVERT EMULSION FLUIDS TO FORM GAS TIGHT ANNULAR BARRIER

CROSS-REFERENCE TO RELATED APPLICATIONS

This application is a divisional application of U.S. patent application Ser. No. 11/537,027, filed on Sep. 29, 2006, which claims priority to U.S. Patent Application Ser. No. 60/722,342 filed Sep. 30, 2005, which is herein incorporated by reference in its entirety.

BACKGROUND OF INVENTION

1. Field of the Invention

The invention relates generally to settable wellbore fluids. More particularly, the invention relates to methods of using these settable wellbore fluids in drilling applications.

2. Background Art

During the drilling of a wellbore, various fluids, often called "mud," are typically used in the well for a variety of functions. The fluids may be circulated through a drill pipe and drill bit into the wellbore, and then may subsequently flow upward through wellbore to the surface. During this circulation, the drilling fluid acts to lubricate and cool rotary drill bits, to prevent blowouts by providing hydrostatic pressure to balance any high-pressure formation fluids that may suddenly enter the wellbore, and to remove cuttings from the wellbore.

One common step during the construction of the wellbore involves placing a pipe string, e.g., casing, into the wellbore. Well casings of various sizes are typically used, depending upon depth, desired hole size, and geological formations encountered. The casing serves several functions, including providing structural support to the wellbore to prevent the formation walls from caving into the wellbore. The casing is typically stabilized and bonded in position within the wellbore. However, because drilling fluids are generally not settable (i.e. they don't develop compressive strength or create a solid bond with casing and formation surfaces), a portion of the drilling fluid is typically removed from the wellbore so that the casings may be set in place by a primary cementing operation.

Primary cementing operations fill at least a portion of the annular space between the casing and the formation wall with a hydraulic cement composition. The cement composition may then be allowed to solidify in the annular space, thereby forming an annular sheath of cement. The cement barrier is desirably impermeable, such that it will prevent the migration of fluid between zones or formations previously penetrated by the wellbore.

When completed, the well's annular space will contain a solidified cement section that bonds the casing, provides support to the casing string and isolates permeable zones, a section that may contain chemical spacers and interfaces of fluids used to place the cement including mud, water, weighting agents, surfactants, salts and cement, and a section that contains drilling mud that was used to drill the interval which was just cased, as described in U.S. Pat. Nos. 4,671,357 and 6,283,213. Over the life of the well these fluids may degrade and separate into the individual components, such as water, solids and oil. This separation may result in a reduction of hydrostatic pressure near the upper edge of the cement.

Problems often encountered in wellbores include those related to the build up of annular casing pressure and the migration of fluids. Pressure often develops in the annular space between casings of differing size because leaks between strings of casing, tubing leaks, packer leaks, wellhead packoff leaks, and substandard cementing jobs. Cracks and fissures in the annular cement barrier may be caused by factors related to the cement composition, cement spacer, chemistry, displacement efficiency, thermal stress (casing expansion/contraction), hydraulic stress, and compaction. Cracks and poor cement bonds may provide a pathway through which high pressure fluids can migrate. Fluid migration can lead to wellbore failure or excessive annular casing pressure build up.

Annular casing pressure build up can occur in wellbores that have been drilled with water or invert emulsion based fluids. Invert emulsion based fluids may show a greater tendency toward annular casing pressure build up due to the inherent incompatibility between oil-based fluids and water-based displacement and cement fluids. These incompatibilities may result in poor cement bond or the degradation of invert emulsion-based fluid suspension characteristics as the fluids synerese into the base components of oil, emulsifiers, solids, and brine. In addition, greater gas solubility in the oil-based fluid may contribute to annular casing pressure development. The predominant suspension properties of an invert emulsion fluid center around the emulsion, whereas for a water-based mud, viscosifying solids and/or polymers are the primary suspending agents.

To remediate and control annular pressure, a relatively heavy liquid is typically pumped into the annular space at the upper end of the well, to displace lighter liquids. However, these procedures are often very costly and do not always give the desired results.

Accordingly, there exists a need for a wellbore that has an impermeable barrier to prevent the build-up of annular casing pressure and the migration of fluids.

SUMMARY OF INVENTION

In one aspect, embodiments of the present invention relate a method for sealing a subterranean zone. The method includes the steps of preparing a wellbore fluid, placing the wellbore fluid into at least a portion of an annular space between the sidewalls of a wellbore and the exterior of a casing string disposed in the wellbore, and allowing the wellbore fluid to solidify therein, wherein the wellbore fluid includes an oleaginous fluid as the continuous phase of the wellbore fluid, a non-oleaginous fluid as the discontinuous phase of the wellbore fluid, and about 5 to about 50 pounds per barrel of a thermally activated hydrocarbon gellant.

In another aspect, embodiments of the present invention relate to a method of sealing a subterranean zone. The method includes the steps of pumping a wellbore fluid into at least a portion of an annular space between the sidewalls of a wellbore and the exterior of a casing string disposed in the wellbore, pumping a cement slurry into at least a portion of the annular space, and allowing the wellbore fluid and cement to solidify therein, wherein the wellbore fluid includes an oleaginous fluid and from about 5 to about 50 pounds per barrel of a thermally activated hydrocarbon gellant.

In yet another aspect, embodiments of the present invention relate to a wellbore fluid that includes an oleaginous fluid as the continuous phase of the wellbore fluid, a non-oleaginous fluid as the discontinuous phase of the wellbore fluid, and about 5 to about 50 pounds per barrel of a thermally activated hydrocarbon gellant.

Other aspects and advantages of the invention will be apparent from the following description and the appended claims.

DETAILED DESCRIPTION

In one aspect, embodiments of the present invention relate to a wellbore fluid. In particular, embodiments of the invention relate to a wellbore fluid that may solidify in a borehole to create a gas-tight barrier and methods of using such wellbore fluid.

Some embodiments of the present invention relate to chemically treating an oleaginous-based drilling fluid with a thermally activated hydrocarbon gellant prior to cementing a string of casing. The treated drilling fluid may then be pumped through casing and into annulus so that it will remain in the annulus when the cement job is completed. In other embodiments, a treated drilling fluid may be circulated in the annulus of a wellbore which has previously undergone a cementing operation. Furthermore, the oleaginous-based drilling fluid may be optionally treated with a combination of a filtration control additive and/or a fibrous aggregate material to generate a solidified mass under downhole temperature condition.

Figure 1:
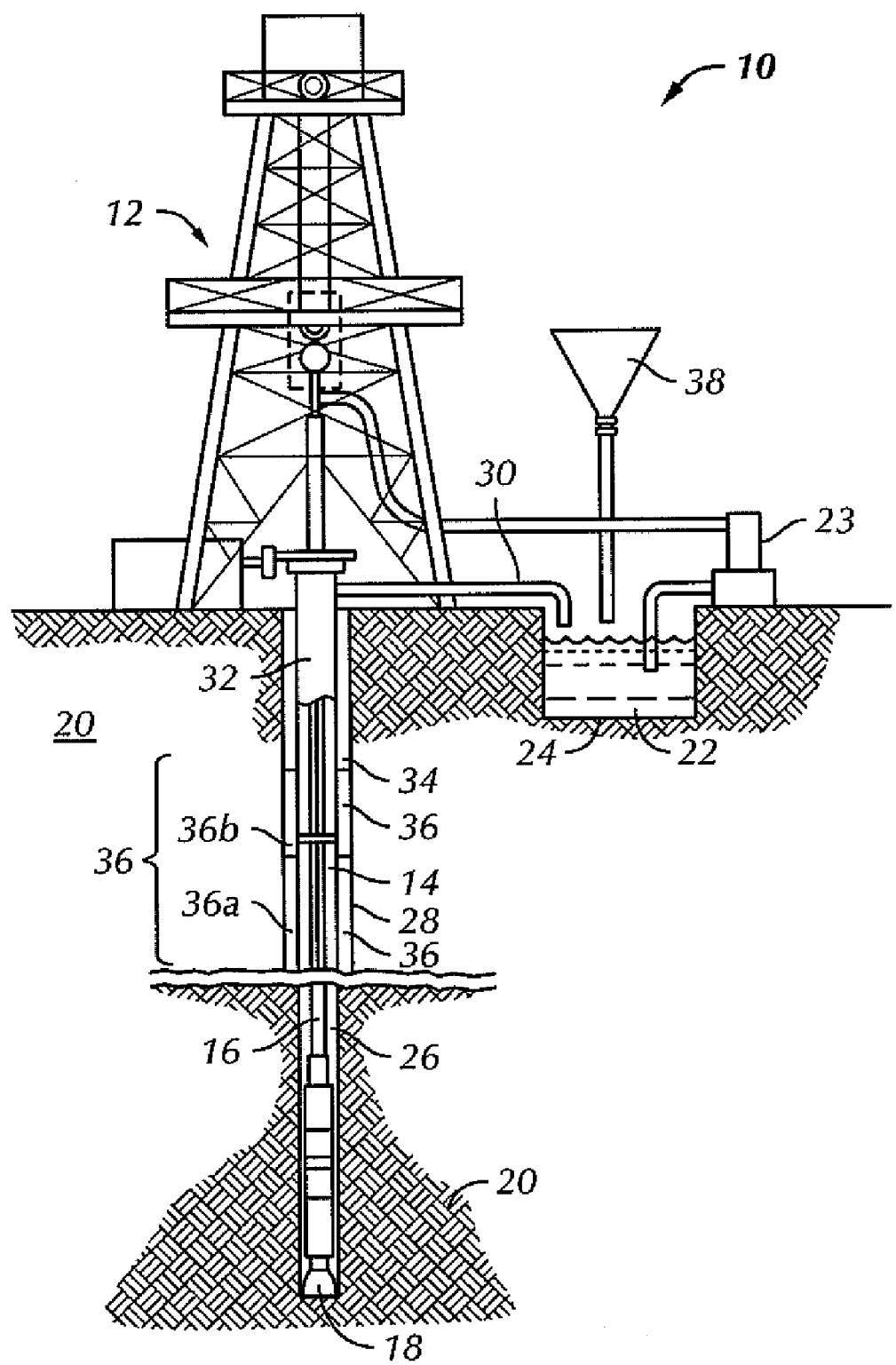
FIG. 1 is an illustration of a drill rig system.

Referring to FIG. 1, a drill rig system 10 in accordance with one embodiment of the present invention is shown. A drilling system 10 includes a drilling rig 12 disposed atop a borehole 14. A drill string 16 is disposed within the borehole 14, which is carved out through the earth formation 20 by the drill bit 18, located at the lower end of the drill string 16. Drilling mud 22 is pumped by a pumping system 23 from a reservoir pit 24 through the drill string 16. This continues to pump drilling mud 22 into and out of the drill bit 18 through nozzles or jets (not shown). Once pumped out of the drill bit 18, the drilling mud returns back to the reservoir pit 24, through an annular passageway 26. The annular region 26 is the region between drill string 16 and the sidewalls 28 of the borehole 14. Annular passageway 26 defines the flow path for drilling mud 22 as it returns to the reservoir pit 24. A fluid exhaust conduit 30 connects the annular passageway 26 at the well head to the reservoir pit 24 for the return flow of drilling mud 22.

Metal casing 32 may be positioned in the borehole 14 to form a protective sheath and maintain integrity in the borehole 14. However, at least a portion of an annular region 34 between the metal casing 32 and the sidewalls 28 of the formation 20 is filled with an impermeable barrier 36. The impermeable barrier 36 may include a lower portion 36a of cement and an upper portion 36b of mud.

According to one embodiment of the present invention, at least a portion of the annular region between the metal casing in the borehole and the sidewall of the formation drilled may include a layer of cement and a layer of solidified wellbore fluid. The solidified wellbore fluid may be formed by allowing a wellbore fluid including an oleaginous fluid and a thermally activated hydrocarbon gellant to set within the annular space.

According to one embodiment of the present invention, a subterranean zone may be sealed by preparing a wellbore fluid that includes an oleaginous fluid and a thermally activated hydrocarbon gellant. The wellbore fluid may be placed in at least a portion of the annular space between the sidewalls of a wellbore and the exterior of a casing string disposed in the wellbore. The wellbore fluid may then be allowed to solidify therein. In some embodiments, a cement slurry may also be placed in at least a portion of the annular space between the sidewalls of the wellbore and the exterior of the casing string. The cement slurry may be placed in the annular space either before or after the wellbore fluid is placed in the annular space. In other embodiments, at least a portion of the annular space is occupied with a pre-solidified or partially solidified cement barrier prior to the treated wellbore fluid being placed in the annular space.

According to another embodiment of the present invention, a subterranean zone may be sealed by pumping a wellbore fluid into at least a portion of an annular space between the sidewalls of a wellbore and the exterior of a casing string disposed in the wellbore. The wellbore fluid may include an oleaginous fluid and a thermally activated hydrocarbon gellant. A cement slurry may be pumped into at least a portion of the annular space and the wellbore fluid and cement may be allowed to solidify therein. In some embodiments, the pumping of the wellbore fluid and the cement slurry occurs by pumping the wellbore fluid and the cement slurry through the casing string to fill the annular space.

According to yet another embodiment of the present invention, a wellbore fluid may include an oleaginous fluid as the continuous phase of the wellbore fluid, a non-oleaginous fluid as the discontinuous phase of the wellbore fluid, a thermally activated hydrocarbon gellant, a fibrous material, and a fluid loss control agent. The wellbore fluid may include about 5 to about 50 pounds per barrel of the thermally activated hydrocarbon gellant. In some embodiments, the wellbore fluid include about 15 to about 35 pounds per barrel of the thermally activated hydrocarbon gellant.

According to some embodiments of the present invention, a wellbore fluid may be placed into the wellbore as a remediation measure, the specific process dependent upon whether a stage cementing tool was configured in the casing string prior to running the casing. If the stage cementing tool was configured in the casing string, after the first stage of cement was placed around the shoe of the casing, the stage tool may be opened to permit circulation of fluids through the annulus above the primary cement job. A wellbore fluid including an oleaginous fluid and a thermally activated hydrocarbon gellant may be placed into and circulated through the annulus. Additionally, a secondary cement stage may follow.

However, if a stage tool had not been previously installed in the metal casing, access to the annular space may be obtained by perforating the casing. Once the metal casing is perforated, wellbore fluids that include an oleaginous fluid and a thermally activated hydrocarbon gellant may be placed into and circulated through the annulus. The circulation of the treated oleaginous base fluid would precede any secondary or remediation cement treatment.

The oleaginous fluid of the present invention may include a natural or synthetic oil. Preferably the oleaginous fluid is selected from the group including diesel oil, mineral oil, and a synthetic oil, such as polyolefins, polydiorganosiloxanes, siloxanes or organosiloxanes, esters, and mixtures thereof. The concentration of the oleaginous fluid should be sufficient so that an invert emulsion forms and may be less than about 99% by volume of the invert emulsion. In one embodiment the amount of oleaginous fluid is from about 30% to about 95% by volume and more preferably about 40% to about 90% by volume of the invert emulsion fluid. The oleaginous fluid in one embodiment may include at least 5% by volume of a material selected from the group including esters, ethers, acetals, dialkylcarbonates, hydrocarbons, and combinations thereof.

The non-oleaginous fluid used in the formulation of the invert emulsion fluid of the present invention may be an aqueous liquid. Preferably, the non-oleaginous liquid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion. Thus in one embodiment the amount of non-oleaginous fluid is less than about 70% by volume and preferably from about 1% to about 70% by volume. In another embodiment, the non-oleaginous fluid is preferably from about 5% to about 60% by volume of the invert emulsion fluid.

The method used in preparing the drilling fluids of the present invention is not critical. Conventional methods can be used to prepare the drilling fluids of the present invention in a manner analogous to those normally used, to prepare conventional oil-based drilling fluids. In one representative procedure, a desired quantity of oleaginous fluid such as a base oil and a suitable amount of emulsifier are mixed together and the remaining components are added sequentially with continuous mixing. All types of emulsifiers, including rheology modifiers may be used to prepare the drilling fluids of the present invention. Versa-HRP™, Versamod™ are examples of rheology modifiers that may be used as emulsifiers and are commercially available from M-I L.L.C., Houston, Tex. An invert emulsion of the present invention is formed by vigorously agitating, mixing or shearing the oleaginous fluid and the non-oleaginous fluid.

The thermally activated hydrocarbon that may be used in embodiments of the present invention may be used in the invert emulsion fluid without affecting the rheological properties of the fluid until it is thermally activated. The hydrocarbon gellant may be introduced to the wellbore fluid through a conventional mixing hopper. Activation of the hydrocarbon gellant may begin after the wellbore fluid containing the thermally activated hydrocarbon gellant is pumped into a wellbore and is triggered by the temperature of the surrounding formation. According to one embodiment of the present invention, the thermally activated hydrocarbon gellant is an alkyl diamide. According to another embodiment, the thermally activated hydrocarbon gellant is an alkyl diamide, such as those having the general formula: $R_1$—HN—CO—$(CH_2)_n$—CO—NH—$R_2$ wherein n is an integer from 1 to 20, more preferably from 1 to 4, even more preferably from 1 to 2, $R_1$ is an alkyl group having from 1 to 20 carbons, more preferably from 4 to 12 carbons and even more preferably from 5 to 8 carbons, and $R_2$ is a hydrogen or an alkyl group having from 1 to 20 carbons, more preferably from 4 to 12 carbons and even more preferably from 5 to 8 carbons, wherein $R_1$ and $R_2$ may or may not be identical.

The hydrocarbon gellant may generate viscosity and develops gel structure when sheared and heated above 140° F. When the hydrocarbon gellant is fully activated, the gel structure remains stable even if the temperature drops below 140° F. However, when used at a temperature above its melting point (240° F.), the rheological effect gradually decreases. In some embodiments of the present invention, the thermally activated hydrocarbon gellant may be activated upon an exposure temperature ranging from about 100° F. to about 250° F. over varying lengths of time. In other embodiments, the thermally activated hydrocarbon gellant may be activated upon an exposure temperature of about 140° F.

Versapac™ is an example of a thermally activated hydrocarbon gellant that may be used according to embodiments of the present invention and is commercially available from M-I L.L.C., Houston, Tex. VersaPac™ is activated by a combination of heat and shear. In the absence of shear and below the temperature of activation, the rheological effect of VersaPac™ is minimal because the particles do not swell. The gelling mechanism involves the swelling of the initial agglomerates and a gradual release of individual oligomer chains. The released oligomers then associate with other particulate material to produce the rheological effect. The build-up of this structure is thixotropic as it involves re-alignment of the initial structure to the most thermodynamically stable configuration. When totally activated, a type of micelle structure is formed involving the gelling agent and the other components in the system.

According to one embodiment of the present invention, the thermally activated hydrocarbon gellant may be present in the wellbore fluid in an amount ranging from about 5 to about 50 pounds per barrel. In another embodiment, the thermally activated gellant may be present in an amount ranging from about 15 to about 35 pounds per barrel. In yet another embodiment, the thermally activated hydrocarbon gellant may be present in an amount ranging from about 20 to about 30 pounds per barrel.

Referring to FIG. 1, the thermally activated hydrocarbon gellant may be added to the wellbore fluid in a mud mixing hopper 38. According to one embodiment of the present invention, the wellbore fluid containing the thermally activated hydrocarbon gellant may be added through the metal casing string 32 to fill at least a portion of the annular region 34 between the exterior of the casing 32 and the sidewalls 28 of the formation 20.

Figure 2A:
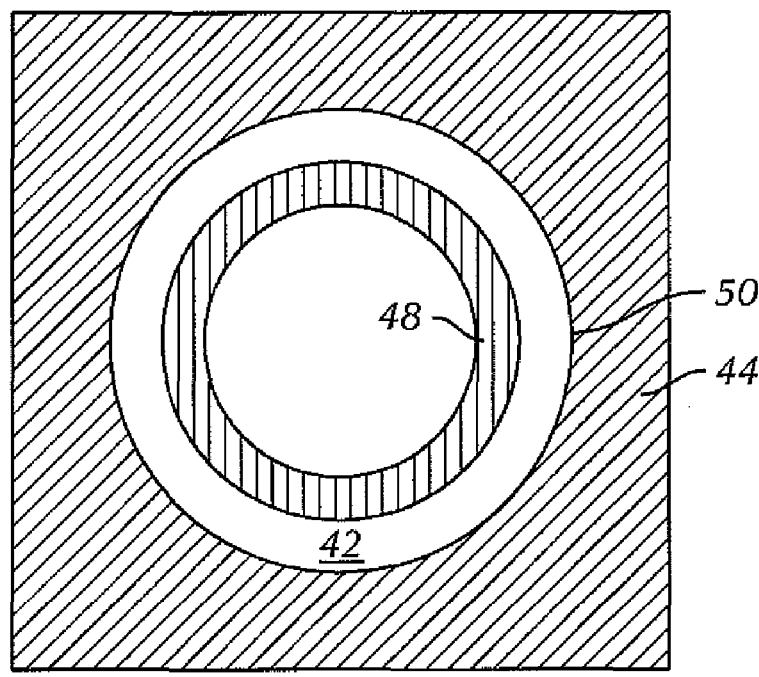
FIGS. 2a and 2b are an illustration of a wellbore according to one embodiment of the present invention.
Figure 2B:
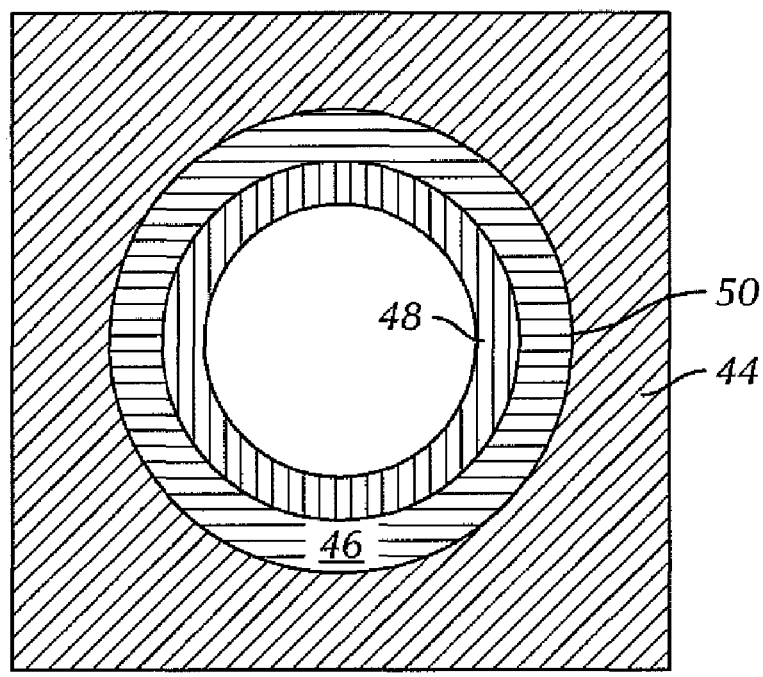

Referring to FIGS. 2a and 2b, a wellbore according to one embodiment of the present invention is shown. Once the wellbore fluid has filled at least a portion of the annular region 42 of the wellbore, the temperature from the formation 44 will activate the thermally activated hydrocarbon gellant and initiate the solidification process. The solidified wellbore fluid 46 forms a protective barrier, occupying the region between the exterior of the casing 48 and the sidewalls 50 of the formation 44.

An additive that may be optionally included in the wellbore fluid of the present invention includes a fibrous material. One of ordinary skill in the art should appreciate that the use of "inert" fibrous materials can be added to reduce excess fluids by soaking up these fluids. Examples of such materials include gross cellulose, peanut hulls, cotton seed hulls, woody material, and other plant fibers that should be well known to one of skill in the art. In some embodiments of the present invention, the wellbore fluid may also include from about 3 to about 25 pounds per barrel of a fibrous material. M-I-X II™ and Vinseal™ are examples of fibrous materials that may be used according to some embodiments of the present invention and are commercially available from M-I L.L.C., Houston, Tex.

Another typical additive to oleaginous drilling fluids that may optionally be included in the oleaginous drilling fluids of the present invention is a fluid loss control agent. Fluid loss control agents may act to prevent the loss of fluid to the surrounding formation by reducing the permeability of the barrier of solidified wellbore fluid. Suitable fluid loss control agents which may used according to some embodiments of the present invention include those such as modified lignites, asphaltic compounds, gilsonite, organophilic humates prepared by reacting humic acid with amides or polyalkylene polyamines, graphites and cokes, and other non-toxic fluid loss additives. Usually such fluid loss control agents are employed in an amount which is at least from about 3 to about 15 pounds per barrel. The fluid-loss reducing agent should be tolerant to elevated temperatures, and inert or biodegradable. ECOTROL RD™, a fluid control agent that may be used in the wellbore fluid, is commercially available from M-I L.L.C., Houston, Tex.

The fluids of the present invention may further contain additional chemicals depending upon the end use of the invert emulsion. For example, wetting agents, organophilic clays, viscosifiers, rheological modifiers, alkalinity agents, scavengers, weighting agents, and bridging agents may be added to the fluid compositions of this invention for additional functional properties. The addition of such agents should be well known to one of skill in the art of formulating drilling fluids and muds. However, it should be noted that the addition of such agents should not adversely interfere with the properties associated with the mud's ability to solidify as described herein.

Wetting agents that may be suitable for use in this invention include, crude tall oil, oxidized crude tall oil, surfactants, organic phosphate esters, modified imidazolines and amidoamines, alkyl aromatic sulfates and sulfonates, and the like, and combinations or derivatives of these. Versawet™ and Versawet™ NS are examples of commercially available wetting agents manufactured and distributed by M-I L.L.C., Houston, Tex. that may be used in this invention.

Organophilic clays, typically amine treated clays, may be useful as viscosifiers in the fluid compositions of the present invention. Other viscosifiers, such as oil soluble polymers, polyamide resins, polycarboxylic acids and soaps can also be used. The amount of viscosifier used in the composition can vary depending upon the end use of the composition. However, normally about 0.1% to 6% by weight is a sufficient range for most applications. VG-69™ and VG-PLUS™ are organoclay materials distributed by M-I L.L.C., and VersaHRP™ is a polyamide resin material manufactured and distributed by M-I L.L.C., that may be used in this invention.

Weighting agents or density materials suitable for use in this invention include galena, hematite, magnetite, iron oxides, illmenite, barite, siderite, celestite, dolomite, calcite, and the like. The quantity of such material added, if any, depends upon the desired density of the final composition. Typically, weight material is added to result in a drilling fluid density of up to about 24 pounds per gallon. The weight material is preferably added up to 21 pounds per gallon and most preferably up to 19.5 pounds per gallon.

EXAMPLES

Formulations/Shear Testing

The following examples show various wellbore fluids according to embodiments of the present invention. The wellbore fluid compositions tested according to the API "Shear Strength Measurement using the Shearometer Tube" include varying amounts of NovaPlus™, a synthetic drilling fluid, VersaPac™, a thermally activated hydrocarbon gellant, M-I-X II™, a cellulose fiber, and Ecotrol™, a fluid loss control agent, all available from M-I L.L.C., Houston, Tex. Each fluid was placed in a test cell and then solidified by exposing the fluids to temperatures of 180° F. over a 16 hour period of time. Each solidified fluid, before removal from the test cell, was subjected to a shear test with the use of a shearometer tube and a set of weights to measure the shear strength of each mud composition. The shear tube is placed on the surface of the solidified mud and weights are applied to force the tube into the solidified fluid. The applied weight and measured tube penetration are used to calculate the shear strength of the sample.

The compositions of Fluids 1-4 and the shear test results for each composition are shown in Table 1 below. Fluid 1 demonstrates a set fluid that is solid throughout the sample. It stands free under its own self-weight and feels dry to the touch. Fluid 2 is not set as solidly set as Fluid 1. While it does stand free under its own weight, liquid seepage is evidenced when the sample is manipulated. Fluid 3 appears to be more solid than and was easier to remove from the test cell than both Fluids 1 and 2. Fluid 4 appears even more solid than Fluids 1-3 and was slightly easier to remove from the test cell than Fluid 3, possibly due to a more solid set. From Fluids 1-4 the addition of the fibrous material, M-I-X II appears to double the shear strength of the compositions.

TABLE 1

| | | Fluid No. | | | |
|---|---|---|---|---|---|
| | Unit | 1 | 2 | 3 | 4 |
| Composition | | | | | |
| NovaPlus | mL/g | 350/592.2 | 350/592.2 | 350/592.2 | 350/592.2 |
| VersaPac | g | 20 | 20 | 20 | 20 |
| M-I-X II | g | 5 | — | 5 | — |
| Ecotrol | g | 5 | 5 | — | — |
| Shear Test | | | | | |
| Insertion | mm | 28 | 55 | 29 | 80 |
| Mass | g | 900 | 900 | 900 | 900 |
| Shear Strength | Pa | 1443 | 734 | 1393 | 504 |

The compositions of Fluids 9-12 and the shear test results for each composition are shown in Table 2 below. Fluid 9 demonstrates relative ease of removal of the sample from the aging cell, with some relatively soft mud left on the aging cell. Fluid 9 can be spread like soft margarine and shows a reasonably even, homogenous sample. Fluid 10 is similar to Fluid 9; however, spreading is slightly more difficult, similar to spreading plaster. Fluid 11 is more difficult to remove from the aging cell than Fluids 9-10 and 11. The mud appears drier than the others and shows reasonable hardness throughout the sample. This fluid can be spread like putty. Fluid 12 was removed from the aging cell as a whole, more easily than Fluid 11. Similar to Fluid 11, it can be spread like putty and demonstrates an even set throughout. Furthermore, a small change (+/−2 ppb) of Ecotrol™ appears to make less of a difference than a larger change (+/−5 ppb) of VersaPac™, in terms of reducing the amount of apparent free oil when testing the samples with filter paper.

TABLE 2

| | | Fluid No. | | | |
|---|---|---|---|---|---|
| | Unit | 9 | 10 | 11 | 12 |
| Composition | | | | | |
| NovaPlus | mL/g | 350/592.2 | 350/592.2 | 350/592.2 | 350/592.2 |
| VersaPac | g | 10 | 10 | 15 | 15 |
| M-I-X II | g | 4 | 4 | 4 | 4 |
| Ecotrol | g | 2 | 4 | 2 | 4 |
| Shear Test | | | | | |
| Insertion | mm | 23 | 27 | 14 | 18 |
| Mass | g | 250 | 250 | 350 | 400 |
| Shear Strength | Pa | 515 | 438 | 1161 | 1025 |

The compositions of Fluids 13-15 and the shear test results for each composition are shown in Table 3 below. Fluid 13 feels relatively wet to the touch, as compared to Fluids 14 and 15. It demonstrates smoothness around the edges of the sample and retains its shape when left for several days. Fluid 14 demonstrates less wetness than Fluid 13 and appears to be of equal hardness throughout the sample. The sample's removal from the aging cell showed tensile failure necking, with half of the material left in the aging cell. Upon being left exposed for several days, Fluid 14 fractured. Fluid 15 appears to be relatively dry, similar to a hard set chocolate mousse, and is the most aerated-looking when viewed from within the cell. Removal from the aging cell left the sample almost whole. Upon being left exposed for several days, Fluid 15 appeared brittle. From Fluids 13-15, it appears that a change in the amount of Ecotrol™ causes a change in the wetness of the sample, similar to that caused by a change in the amount of VersaPac™, and affects the hardness and shear strength of the samples.

TABLE 3

|  | Unit | Fluid No. | | |
|---|---|---|---|---|
|  |  | 13 | 14 | 15 |
| Composition |  |  |  |  |
| NovaPlus | mL/g | 350/592.2 | 350/592.2 | 350/592.2 |
| VersaPac | g | 12 | 12 | 12 |
| M-I-X II | g | 4 | 4 | 4 |
| Ecotrol | g | — | 10 | 20 |
| Shear Test |  |  |  |  |
| Insertion | mm | 39 | 28 | 37 |
| Mass | g | 400 | 400 | 500 |
| Shear Strength | Pa | 472 | 658 | 617 |

Gas Migration Testing

A test was organized to compare the gas tight nature of the solidified pill versus other untreated fluids such as base oil and convention NovaPlus™ mud. In separate tests, each of the fluids was placed in a tube and then aged for 16 hours at 180° F. After aging a nitrogen pressure regulator was connected to one end of the tube and a tube extension was connect to the other end and filled with base oil. Nitrogen was flowed through the tube and gas/fluid discharge was monitored at the other end. In each case when oil and NovaPlus™ drilling mud were in the tube, nitrogen gas at 5 psi passed through the fluid and exited without displacing any of the fluid in the tube. Gas was noted by submerging the exit tube under water and observing bubbles. When the NovaPlus™ fluid was solidified with the chemical treatment, no bubbling was noted, but the fluid was completely displaced from the tube as the pressure was increased to 15 psi as there was no back pressure. No movement occurred at 5 psi, nor at 10 psi.

Advantageously, the present invention provides for a solidifiable wellbore fluid that may be used to form a gas-tight annular barrier and prevent build-up of annular casing pressure. In some embodiments, the wellbore fluid may be used as a preventative measure, as a barrier formed simultaneously with a cement barrier. In other embodiments, the wellbore fluid may be used as a remedial measure, placed in the wellbore upon failure of an existing cement barrier. The wellbore fluid may also allow for placement in the annular region between the formation and the casing as a fluid, with subsequent solidification initiated by the temperature of the surrounding formation. The solidified mass of the treated wellbore fluid may prevent the migration of pressure generating hydrocarbon into the annular space resulting in annular pressure build up. Additionally, the solidified fluid may prevent the subsequent segregation of liquid and solids to maintain density in the annular space.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A wellbore fluid, comprising:
    an oleaginous fluid, wherein the oleaginous fluid is the continuous phase of the wellbore fluid;
    a non-oleaginous fluid, wherein the non-oleaginous fluid is the discontinuous phase of the wellbore fluid; and
    about 15 to about 50 pounds per barrel of a thermally activated hydrocarbon gellant, and
    about 3 to 25 pounds per barrel of a fibrous material,
    wherein the thermally activated hydrocarbon gellant is a $C_1$-$C_{20}$ alkyl diamide.

2. The wellbore fluid of claim 1, wherein the wellbore fluid comprises from about 15 to about 35 pounds per barrel of the thermally activated hydrocarbon gellant.

3. The wellbore fluid of claim 1, wherein the wellbore fluid comprises from about 1 to 10 pounds per barrel of a fluid loss control agent.

4. The wellbore fluid of claim 1, wherein the wellbore fluid solidifies upon an exposure temperature from about 100° F. to about 250° F., wherein the solidified wellbore fluid forms a gas-tight seal between the exterior of a casing string and sidewalls of a formation.

5. The wellbore fluid of claim 1, wherein the thermally activated hydrocarbon gellant comprises the formula:

$$R_1-HN-CO-(CH_2)_n-CO-NH-R_2,$$

wherein n is an integer from 1 to 20, $R_1$ is an alkyl group having from 1 to 20 carbons, and $R_2$ is a hydrogen or an alkyl group having from 1 to 20 carbons, wherein $R_1$ and $R_2$ may or may not be identical.

* * * * *